(12) United States Patent
Yasui

(10) Patent No.: US 8,747,039 B2
(45) Date of Patent: Jun. 10, 2014

(54) BOLT AND NUT WITH ROTATION PROHIBITING MECHANISM

(75) Inventor: Tsutomu Yasui, Gifu-ken (JP)

(73) Assignee: Nabtesco Corporation, Tokyo (JP)

( * ) Notice: Subject to any disclaimer, the term of this patent is extended or adjusted under 35 U.S.C. 154(b) by 741 days.

(21) Appl. No.: 12/921,338

(22) PCT Filed: Mar. 7, 2008

(86) PCT No.: PCT/JP2008/054190
§ 371 (c)(1),
(2), (4) Date: Sep. 7, 2010

(87) PCT Pub. No.: WO2009/110098
PCT Pub. Date: Sep. 11, 2009

(65) Prior Publication Data
US 2011/0014004 A1    Jan. 20, 2011

(51) Int. Cl.
*F16B 39/02* (2006.01)
*F16B 31/02* (2006.01)
*F16B 39/04* (2006.01)

(52) U.S. Cl.
CPC ............... *F16B 39/02* (2013.01); *F16B 31/02* (2013.01); *F16B 39/04* (2013.01)
USPC ............................... 411/315; 411/208; 411/6

(58) Field of Classification Search
CPC ........... F16B 39/00; F16B 39/02; F16B 39/22
USPC ......... 411/1, 6, 190, 204, 205, 208, 315, 337, 411/340, 345, 924, 926, 946–948, 998, 119, 411/120, 129, 166; 403/46, 61, 65, 91, 95
See application file for complete search history.

(56) References Cited

U.S. PATENT DOCUMENTS

| 695,304 | A | * | 3/1902 | Gray | ............................... 411/315 |
| 738,660 | A | * | 9/1903 | Chittum | ........................ 411/207 |

(Continued)

FOREIGN PATENT DOCUMENTS

| CA | 1151626 | 8/1983 |
| JP | S12-1270 Y | 2/1937 |

(Continued)

OTHER PUBLICATIONS

International Preliminary Report on Patentability and Written Opinion in Application No. PCT/JP2008/054190 mailed Oct. 21, 2010, with translation (11 pages).

(Continued)

*Primary Examiner* — Flemming Saether
(74) *Attorney, Agent, or Firm* — Osha Liang LLP

(57) ABSTRACT

A set of a bolt and a nut having a rotation prohibiting mechanism comprises a foldable part (30) at the tip of a bolt (20), that can be folded around an axis perpendicular to a bolt axis. A tip portion (30) can be folded to either sides with the direction extending along the bolt axis as a center. Grooves (18a-18g) for storing the foldable part (30) are formed on a tip surface (a surface from which the tip of the bolt projects out when the bolt and the nut are tightened) of the nut (12) or the knob (18). A number of the grooves is an odd number. The grooves are arranged radially with equal angular intervals with a center at a screw hole of the nut. For example, seven grooves are arranged radially with equal angular intervals. In this case, the angle between adjacent two grooves is about 51.4 degrees, and this angle is to be an expected angular resolution of the rotation prohibition. However, according to the above mentioned set of the bolt and the nut, the expected angular resolution can be halved (i.e. 25.7 degrees).

2 Claims, 5 Drawing Sheets

(56) References Cited

U.S. PATENT DOCUMENTS

| | | | |
|---|---|---|---|
| 828,129 A * | 8/1906 | Laye | 411/205 |
| 1,067,163 A * | 7/1913 | Broomfield | 411/207 |
| 1,420,737 A * | 6/1922 | Palmgren | 411/204 |
| 2,373,812 A * | 4/1945 | Coop | 411/6 |
| 2,881,602 A * | 4/1959 | Baker et al. | 464/35 |
| 3,093,220 A * | 6/1963 | Modrey | 403/408.1 |
| 5,156,482 A * | 10/1992 | Owings | 403/43 |
| 5,810,533 A | 9/1998 | Nakamura | |
| 2004/0047710 A1* | 3/2004 | Lauchner | 411/340 |
| 2011/0014004 A1* | 1/2011 | Yasui | 411/1 |

FOREIGN PATENT DOCUMENTS

| | | |
|---|---|---|
| JP | 54-74064 A | 6/1979 |
| JP | 56-156535 A | 12/1981 |
| JP | 61-58725 U | 4/1986 |
| JP | 5-52327 U | 7/1993 |
| JP | 7-27121 A | 1/1995 |
| JP | 2005-226789 A | 8/2005 |

OTHER PUBLICATIONS

Office Action for Chinese Application No. 200880127843.0 issued Dec. 23, 2011, with partial English translation thereof (7 pages).

Office Action for Russian Application No. 2010139084/11 mailed Jan. 10, 2012, with English translation thereof (7 pages).

International Search Report issued in PCT/JP2008/054190, mailed on May 27, 2008, with translation, 5 pages.

Written Opinion issued in PCT/JP2008/054190, mailed on May 27, 2008, 4 pages.

* cited by examiner

US 8,747,039 B2

BOLT AND NUT WITH ROTATION PROHIBITING MECHANISM

TECHNICAL FIELD

The present invention relates to a set of a bolt and a nut. Especially, the present invention relates to a set of a bolt and a nut having a rotation prohibiting mechanism.

BACKGROUND ART

There exists a requirement to prohibit a relative rotation between a bolt and a nut while tightening the bolt and the nut to each other.

DISCLOSURE OF INVENTION

Technical Problem

The prohibition of the relative rotation between the bolt and the nut can be accomplished by providing a foldable part, at a tip of the bolt, which can be folded around an axis extending perpendicular to the bolt axis, and providing a groove, at a tip surface of the nut, which receives the foldable part.

For example, as shown in FIG. 5, a lock member 46 is provided at the tip of a bolt 40. The lock member 46 swings with a pin 42 which extends perpendicular to a bolt axis 40x as a center. On the other hand, a groove 44a which receives the lock member 46 is provided at the tip surface of a nut 44. Here, the tip surface corresponds to a surface from which the lock member 46 provided at the tip of the bolt 40 projects out. The bolt 40 can be screwed into the nut 44 by aligning the lock member 46 with the bolt axis 40x. The lock member 46 is swung with being centered at the pin 42 and is fitted into the groove 44a after the nut 44 is screwed into until a predetermined depth. Then, a relative rotation between the bolt 40 and the nut 44 is prohibited and a rotation prohibition of the bolt 40 and nut 44 is accomplished.

The rotation prohibition can be achieved by above-mentioned technique. However, in the example shown in FIG. 5, a relative angle between the bolt and the nut for prohibiting the rotation is limited. By the configuration of FIG. 5, the relative rotation between the bolt and the nut can be prohibited only at the one position among 360 degrees.

If a plurality of grooves 44a is provided with being arranged radially, the number of angles at which the relative rotation are prohibited increases. For example, as shown in FIG. 6A, when the two grooves are arranged in line, the rotation prohibition can be achieved at every 180 degrees. As shown in FIG. 6B, when the eight grooves are arranged radially the rotation prohibition can be achieved at every 45 degrees.

When the torque management between the bolt 40 and the nut 44 is severe, it is favorable to increase the number of grooves. For example, as shown in FIG. 5, in a case where the rotation prohibition can be achieved at only one position, the torque at the angle at which the rotation prohibition is realized may be either too strong or too weak. No groove may exist corresponding to an angle at which an appropriate torque can be realized, and thus, there may be a situation where the rotation prohibition can not be achieved at an angle at which an appropriate torque can be realized. As shown in FIG. 6B, if a plurality of grooves is provided with being arranged radially, possibility of prohibiting the rotation at an angle at which the appropriate torque is achieved may increase.

As shown in FIG. 6B, if the eight grooves are arranged radially, the rotation prohibition can be achieved in every 45 degrees relative rotation between the bolt and the nut. This means, in other words, the rotation prohibition has a 45 degrees resolution.

In a case where a strict torque management is required, the 45 degrees resolution may not be enough. With the 45 degrees resolution provided, there may be a case where the torque at the angle at which the rotation prohibition is realized is either too strong or too weak, and thus an appropriate torque can not be achieved. As the requirement for the torque management increases, there is a need to increase the resolution of the angle at which the rotation prohibition can be realized by increasing the number of the grooves.

However, the number of grooves having an appropriate width that can be formed on the nut having a predetermined size is limited. There may be a case where the number of grooves needed for achieving the required resolution can not be formed.

The present invention provides a technique to realize higher resolution than the resolution simply calculated from the number of grooves.

Solution to Technical Problem

A bolt according to the present invention comprises a foldable part at the tip of the bolt. The foldable part can be folded around an axis extending perpendicular to a bolt axis. The foldable part can be folded to either side from a center which corresponds to the bolt axis. The nut according to the present invention has grooves at a tip surface of the nut. Each of the grooves can receive the foldable part. It is noted that the tip surface of the nut corresponds to a surface from which the tip of the bolt projects out when tightening the bolt and the nut to each other. A number of the grooves is an odd number. The grooves are arranged radially with respect to a center at the screw hole of the nut. The grooves are also arranged radially with equal angular intervals.

A case where seven grooves are arranged radially with equal angular intervals will be explained as an example. In this case, the angle between adjacent two grooves is about 51.4 degrees, and this angle is to be an expected angular resolution of the rotation prohibition according to the conventional technique. However, the expected angular resolution can be halved (i.e. 25.7 degrees) according to the present invention.

When the bolt rotates for 25.7 degrees from a position where the foldable part can be inserted into one of the grooves, the foldable part can not be inserted into the groove adjacent to the groove in which the foldable part had been inserted. However, if the foldable part of the bolt is folded to a direction opposite from the direction to which the foldable part had been folded, the foldable part can be inserted into a groove located at the opposite side. If the bolt has the even-number of grooves, the above mentioned relation can not be achieved. However, the angular resolution of rotation prohibition can be doubled by employing the add-numbered grooves. A 60 degrees resolution can be achieved when three grooves are provided; a 36 degrees resolution can be achieved when five grooves are provided; and a 25.7 degree-resolution can be achieved when seven grooves are provided.

The above mentioned set of bolt and nut has an advantage especially in a case where the user tightens the bolt and nut directly by hands without any tools. In the case where the user tightens the bolt and nut directly by hands without any tools, a tightening torque may be low, and thus, the bolt and nut tend to loosen easily. The rotation-prohibition mechanism is useful for such a situation.

Further, the above mentioned set of bolt and nut is especially useful for fixing a device to a body of airplane. The airplane is vibratory and thus, the bolt and nut tend to loosen easily. On the other hand, maintenance and inspection have to be frequently conducted for an airplane, thus the bolt and nut may often need to be loosened. By using the bolt and nut according to the present invention for fixing a device to the body of the airplane, the bolt and nut does not easily loosen under vibration, and does not undermine work efficiency for the maintenance.

According to the present invention, a clutch mechanism may be provided so that a torque larger than a predetermined value is not applied between the bolt and nut. In other words, it is preferable to provide a clutch mechanism for preventing an excessive tightening. In this case, a knob may be provided in addition to the nut. If a clutch mechanism which allows free rotation when an excessive torque is applied between the nut and the knob is provided, the excessive tightening may be prevented. In this case, a predetermined torque may be maintained by engaging the rotation prohibiting mechanism after tightening the nut and knob until they rotate and slip relative to each other.

The bolt of the present invention may be configured to swing with respect to a member to which the bolt is attached. The bolt configured to swing itself has an advantage that the device to be fixed by the bolt and nut may easily be attached or detached.

Advantageous Effects of Invention

The set of bolt and nut according to the present invention provides a resolution of the rotation prohibition higher than the resolution simply calculated from the number of grooves for the rotation prohibition. Further, the set of bolt and nut according to the present invention can satisfy both of the torque management and the rotation prohibition mechanism.

PREFERRED FEATURES FOR REALIZING INVENTION

Features of each embodiment are listed below.
(First feature) A bolt is attached to a body of an airplane.
(Second feature) The bolt swings with respect to the body of the airplane.
(Third feature) A nut is grasped and rotated by a human hand.
Embodiments
Embodiments will be described with reference to the drawings.

Figure 1:
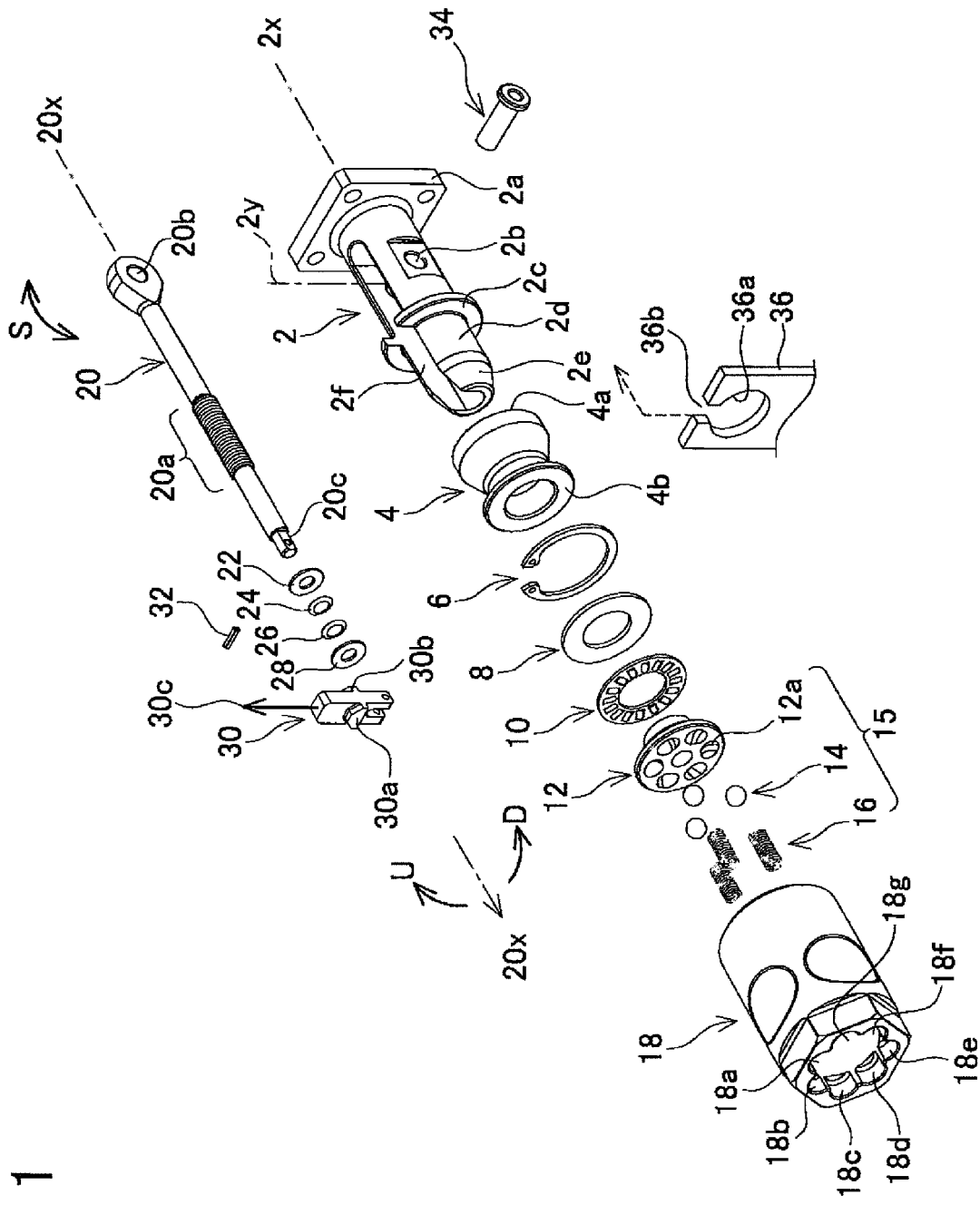
FIG. 1 shows an exploded perspective view of a set of bolt and nut in an embodiment.

FIG. 1 shows an exploded perspective view of a set of a bolt and a nut. A reference numeral 2 denotes a support in which a base 2a is fixed to a body of an airplane. More precisely, the base 2a of the support 2 is fixed to a rack which is fixed to the body of the airplane. A groove 2f is formed on the support 2 along an axis of the support 2. The groove 2f opens toward an upper side. A reference numeral 2c is a brim to which a flange 36 of an electronic device for the airplane is fixed with a nut 18. A through hole 2b is formed on each of side walls which define the groove 2f.

A bolt 20 is stored in the groove 2f. A through hole 20b is formed at an base end of the bolt 20. A threaded ridge 20a is formed on an outer periphery of the bolt 20 at a middle portion thereof. A though hole 20c is formed at a tip end of the bolt 20. A pin 34 is inserted in the though hole 20b of the bolt 20. The pin 34 is inserted into the though holes 2b of the support 2 and fixed. The bolt 20 can swing around the pin 34 (refer to an arrow S). The bolt 20 can take a position at which the bolt 20 extends in groove 2f along an axis center 2x, and can rotate upward for 90 degrees and extend along a vertical line 2y. A partial spherical surface 2e having a center near the through hole 2b is formed at the tip of the support 2. A cylindrical portion 2d is formed at a rear side of the partial spherical surface 2e. The groove 2f extends along the axis center line 2x of the support 2 and extends through the brim 2c, the cylindrical portion 2d, and the partial spherical surface 2e.

A lock member 30 is attached at the tip end of the bolt 20 by a pin 32 which extends perpendicular to a volt axis 20x. The lock member 30 is able to swing around the pin 32. The lock member 30 is able to take a position at which a longitudinal direction of the lock member 30 extends along the bolt axis 20x, a position at which the longitudinal direction of the lock member 30 extends upward vertically, and a position at which the longitudinal direction of the lock member 30 extends downward vertically. That is to say, the lock member 30 is able to swing from the position at which the longitudinal direction of the lock member 30 extends along the bolt axis 20x to upward (denoted by the arrow U) as well as downward (denoted by the arrow D).

The lock member 30 has convex portions 30a and 30b which are inserted into grooves 18a~18g described later. The convex portion 30a is formed on a front side of the lock member 30 and the convex portion 30b is formed on a backside of the lock member 30. When the lock member 30 swings upward, the convex portion 30b is inserted into one of the grooves 18a~18g described later. When the lock member 30 swings downward, the convex portion 30a is inserted into one of the grooves 18a~18g described later. The lock member 30 is inserted into one of the grooves 18a~18g when it swings either upward or downward.

Washers 22, 24, 26, 28, and so on are provided between the lock member 30 and the bolt 20. The lock member 30 corresponds to a foldable part at the tip of the bolt 20. The foldable part is able to swing around the axis 32 which extends perpendicular to the bolt axis 20x.

The bolt 20 extends through members denoted by numerals 4 to 18 in FIG. 1. The knob 18 is provided to the bolt 20 where the washer 28 prevents the knob 18 from dropping out from the bolt 20.

Figure 2:
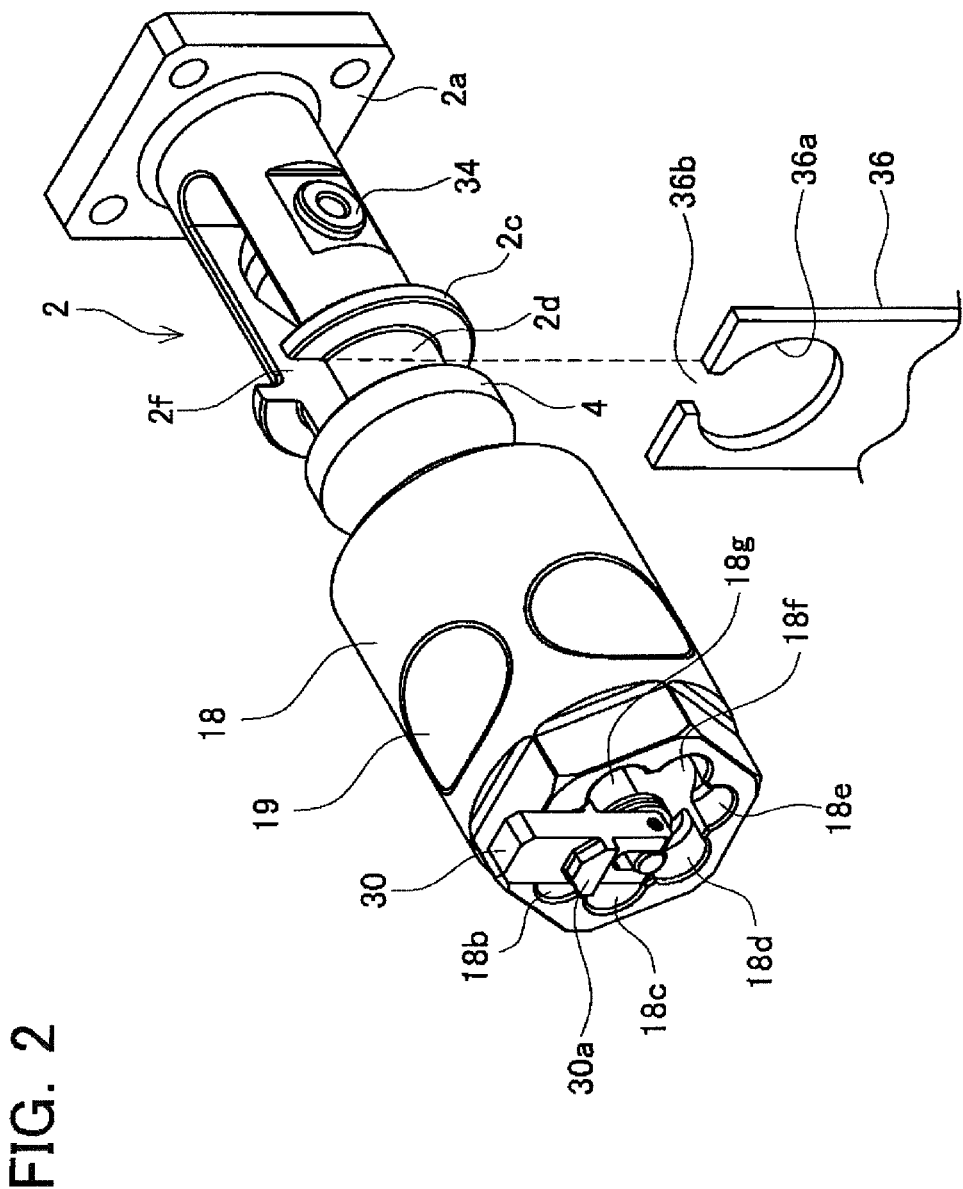
FIG. 2 shows a perspective view of the set of bolt and nut in the embodiment.

The numeral 4 in the drawings is a holder. As shown in FIG. 2, a contact surface 4a is provided at a base side of the holder 4. The contact surface 4a sandwiches the flange 36 with the brim 2c. A concave portion (not shown) is formed at the center of the contact surface 4a. The concave portion forms a partial spherical surface having its center near the through hole 2b. The concave portion of a partial spherical surface can slip with respect to the partial spherical surface 2e. That is to say, the holder 4 is able to move up or down with centering at the through hole 2b and along the partial spherical surface 2e. A tip surface 4b of the holder 4 is flat.

The numerals 6, 8 in the drawings denote washers.

The numeral 10 in the drawings denotes a needle roller and a cage, and they facilitate smooth rotation of the nut 12. A female screw thread is formed at the through hole of the nut 12 which is screwed with the threaded ridge 20a of the bolt.

When the nut rotates in a clockwise direction, the nut 12 and the holder 4 move forward toward the base end of the bolt 20. Then, the support 2 is deeply inserted to the holder 4, and the swing of the bolt 20 around the pin 34 is prohibited. The bolt 20 is fixed with the position at which the bolt axis 20x is aligned with the axis center line 2x of the support 2. When the nut 12 further rotates in the clockwise direction, and the holder 4 further moves forward toward the base of the bolt 20, the flange 36 of the electric device for the airplane is fixed as shown in FIG. 2.

The nut 12 is stored in the knob 18. Thus, the nut 12 can not be rotated directly. The clutch mechanism 15 is provided between the nut 12 and the knob 18. The clutch mechanism 15 is configured by six concave portions 12a formed on a tip surface of the nut 12, the three balls 14, and the three springs 16. The three springs 16 are pressed onto the balls 14 by the knob 16, and the balls 14 are pressed onto the concave portions 12a.

The clutch mechanism 15 rotates the nut 12 in the clockwise direction when the knob 18 is rotated in the clockwise direction. When a resisting force against the nut 12 reaches a predetermined torque, the nut 12 does not rotate further even if the knob 18 rotates because the balls 14 pop out from the concave portions 12a. The clutch mechanism 15 prevents the tightening torque for the nut 12 from exceeding a predetermined value. On the other hand the clutch mechanism 15 rotates the nut 12 in a counter clockwise direction when the knob 18 rotates in the counter clockwise direction. The clutch mechanism 15 is not released by the rotation to the direction which the nut 12 loosens.

The seven grooves 18a-18g which receive the lock member 30 are formed at the tip surface of the knob 18. The tip surface is a surface of the knob 18 from which side the lock member 30 projects out when the bolt 20 and the nut 12 are tightened to each other. The number of the grooves is an odd number. The grooves are formed by being arranged radially with respect to the center hole of the knob 18. The grooves are also arranged with equal angular intervals. FIG. 2 shows a configuration in which the convex portion 30b of the lock member 30 is inserted in the groove 18a.

Figure 4A:
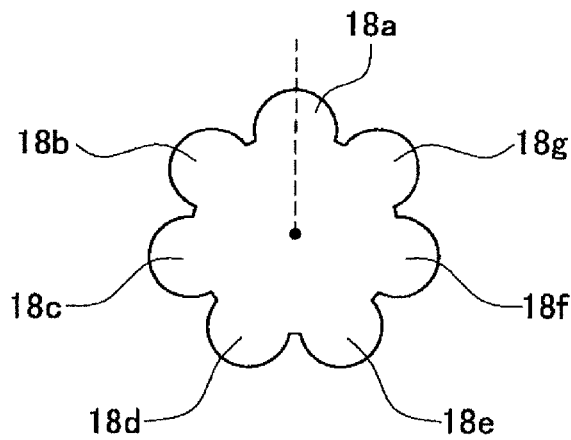
FIG. 4A to FIG. 4C show front views of grooves for rotation-prohibition.
Figure 4B:
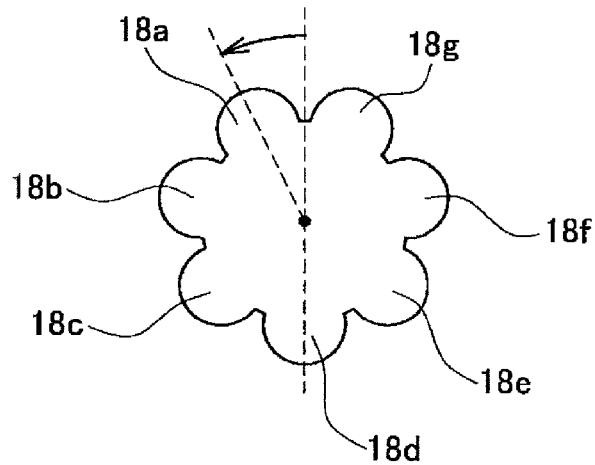
Figure 4C:
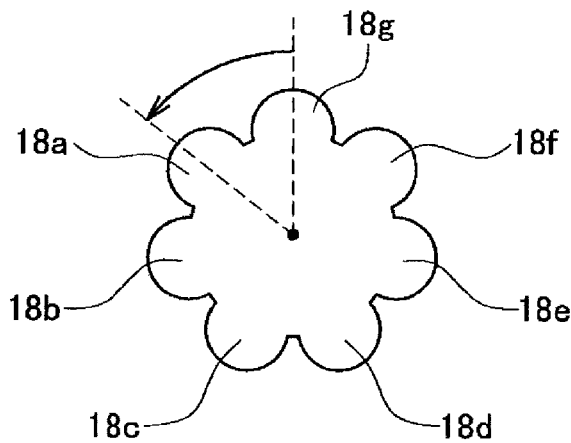
Figure 5:
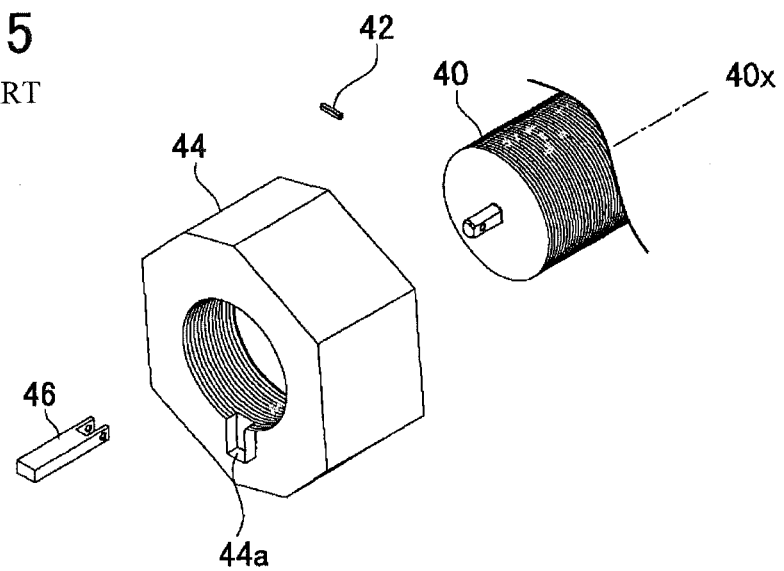
FIG. 5 schematically shows the conventional bolt and nut.
Figure 6A:
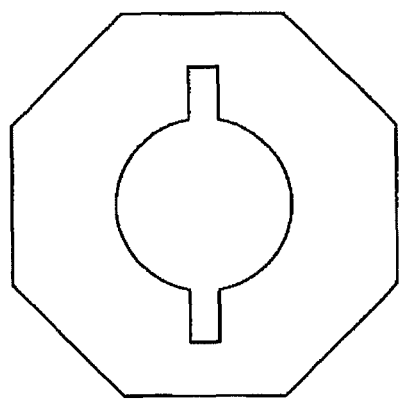
FIG. 6A and FIG. 6B schematically show the conventional nut.
Figure 6B:
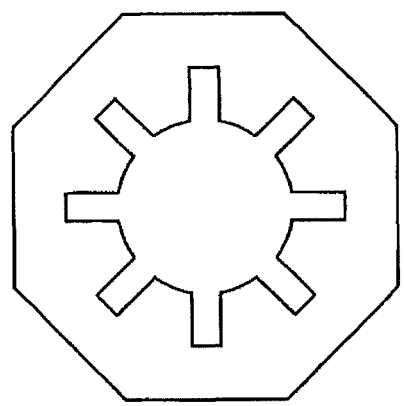

FIG. 4A depicts a configuration in which the lock member 30 is folded upward and the convex portion 30b is inserted in the groove 18a. As shown in FIG. 4C, the bolt 20 should be rotated for 51.4 degrees from a position shown in FIG. 4A in order to achieve the rotation prohibition by inserting the convex portion 30b into the groove 18g. A resolution for the rotation prohibition is 51.4 degrees when the resolution is simply calculated from the number of grooves.

However, in this embodiment, the convex portion 30a can be inserted into one of the grooves 18 by folding the lock member 30 downward. By utilizing the configuration, as shown in FIG. 4B, the convex portion 30a can be inserted into the groove 18d and thus, the rotation prohibition can be achieved by rotating the bolt 20 for 25.7 degrees from a position shown in FIG. 4A. Therefore, the resolution for the rotation prohibition becomes 25.7 degrees.

As described in the embodiment, the resolution for the rotation prohibition can be achieved with a step width order not of (360 degrees)/(the number of grooves) but of (360 degrees)/(twice of the number of the grooves), according to the configuration in which the odd-numbered grooves are arranged radially with equal angular intervals and the lock member 30 can be inserted into the groove by folding the lock member 30 either upward or downward.

Figure 3A:
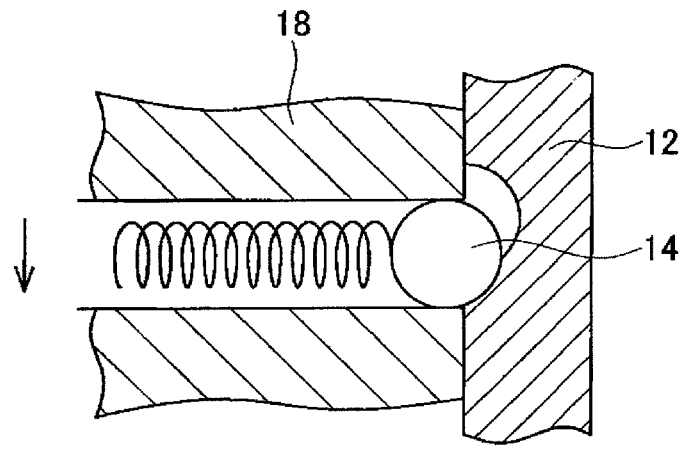
FIG. 3A to FIG. 3C schematically show the configuration of a clutch mechanism provided between the knob and the nut in the embodiment.
Figure 3B:
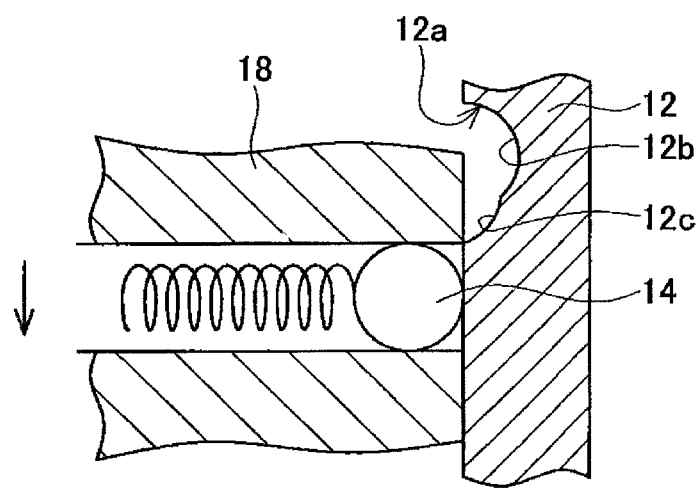
Figure 3C:
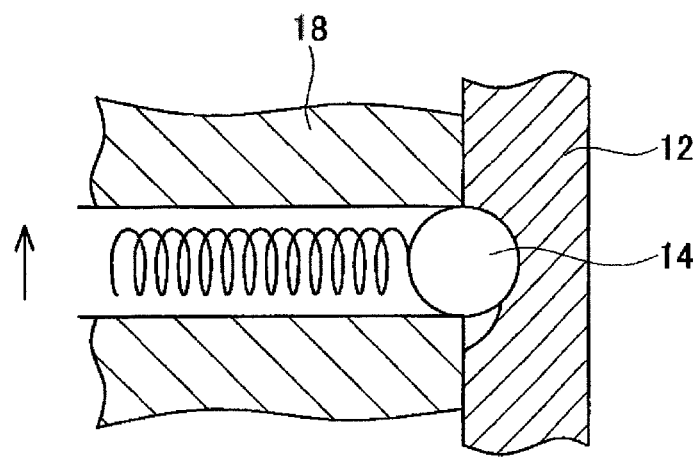

FIGS. 3A-3C schematically show an action of the clutch 15.

FIG. 3A shows a situation in which the nut 12 is tightened by rotating the knob 18 in the clockwise direction with a small torque. FIG. 3B shows a situation in which the resisting force against the nut 12 reaches the predetermined torque, and a toque larger than the predetermined torque is applied to the knob 18. In this situation, the ball 14 pops out from a shallow concave portion 12c and thus, the nut 12 no longer rotate even if the knob 18 rotates. The clutch mechanism 15 prevents the tightening torque for the nut 12 from exceeding the predetermined value. In the actual situation of operation, the user tightens the knob 18 until the knob 18 rotates freely with respect to the nut 12. That is to say, the user tightens the knob 18 until the ball 14 pops out from the shallow concave portion 12c and drops into the adjacent concave portion 12a. The user can be clearly aware of an occurrence, though his or her hand, of the ball popping out from the shallow concave portion 12c and dropping into the adjacent concave portion 12a. When this occurrence is sensed, the nut 12 and the bolt 20 are tightened with the predetermined torque. The user can confirm, by a feeling of his or her own hand, that the bolt and the nut are surely tightened with the predetermined torque.

FIG. 3C shows a situation in which the nut 12 is loosened by rotating the knob 18 in the counter clockwise direction. When the knob 18 rotates in the counter clockwise direction, the ball 14 engages with a deep groove 12b, and thus, the ball 14 is not able to pop up from the concave portion 12b even if the large torque is applied to the knob 18. The clutch mechanism 15 is not released by the rotation to the direction which the nut 12 loosens.

According to the bolt in the embodiment, the flange 36 of the electric device for the airplane opens at the same direction as the opening of the groove 2f. Therefore, the bolt 20 can be swung upward by loosening the knob 18 and the nut 12 while the support 2 supports the electric device for the airplane. In this situation, the flange 36 of the electric device for the airplane can be easily detached from the support 2.

As shown in FIGS. 1 and 2, a hole 36a in which the cylindrical portion 2d of the support 2 extends through is provided on the flange 36. Further, a slit 36b through which the bolt 20 extends is provided. Since the slit 36b is provided, the bolt 20 can be swung vertically upward while the support 2 is inserted into the flange 36. When the bolt 20 is swung vertically upward, the bracket 36 can move forward to the front of the support 2. The slit 36b is too narrow for the cylindrical portion 2d to cross over. Nevertheless, the flange 36 can be detached from the support 2. The hole 36a is not formed with a U-shape but formed with a C-shape having the narrow slit 36b. This configuration provides a wider contact surface between the brim 2c and the flange 36. Due to this configuration, the electric device for the airplane can be fixed firmly. Further, the flange 36 is not dropped from the support 2 unless the bolt 20 is swung vertically upward.

When the bolt 20 is swung vertically upward, the flange 36 which has been detached from the support 2 can be easily attached to the support 2. The cylindrical portion 2d can be inserted into the hole 36a by utilizing the partial spherical surface 2e. The flange 36 opens at the same direction as the opening of the groove 2f by the slit 36b. Therefore, while maintaining the situation, the bolt 20 can be aligned with the support 2. By tightening the knob 18 and the nut 12 under this situation, the flange 36 of the electric device for the airplane can be fixed by the bolt 20 and the nut 12.

It is noted that dimples 19 are provided around a periphery of the knob 18 so that the user can easily grasp the knob 18. The user can tighten the knob 18 by his or her hand without using any tools until the clutch mechanism 15 rotates with slip.

The specific embodiment of the present invention is described above, but these merely illustrate some embodiments of the invention and do not restrict the claims thereof. The art set forth in the claims includes various transformations and modifications to the specific embodiments as set forth above.

For example, in the above described embodiment, the nut 12 and the knob 18 are provided separately in order to utilize the clutch mechanism 15 which controls tightening torque. According to the above mentioned configuration, the nut 12 and the knob 18 rotate together when loosening the nut 12. While loosening the nut, the nut 12 is integral with the knob 18 and the knob can be regarded as a part of the nut. Grooves may be formed either on the nut or the knob when the clutch mechanism is employed.

In the embodiment, the bolt and the nut swing together with respect to the support 2. Therefore, the work for detaching/attaching the device from/to the bolt 20 can be facilitated. However, the present invention can also be applied to a bolt which does not swing, and it is preferable to provide the lock member to the bolt which does not swing.

The technical elements disclosed in the present specification or figures may be utilized separately or in all types of conjunctions and are not limited to the conjunctions set forth in the claims at the time of filing of the application. Furthermore, the art disclosed in the present specification or figures may be utilized to simultaneously realize a plurality of aims or to realize one of these aims.

The invention claimed is:

1. An apparatus comprising:
a nut;
a bolt comprising a foldable part provided at a tip of the bolt, the foldable part being foldable from a direction along a bolt axis to either side around an axis perpendicular to the bolt axis;
a knob that applies a torque and comprises an odd number of grooves formed at a tip surface of the knob, each of the grooves being configured to receive the foldable part and arranged radially with equal angular intervals with a center at a screw hole of the nut; and
a clutch provided between the knob and the nut, wherein the clutch mechanism rotates the knob freely with respect to the nut when a torque exceeding a predetermined value is applied,
wherein the foldable part is configured to prohibit rotation between the nut and bolt at an angular resolution not more than 360 degrees divided by twice the number of the grooves.

2. The apparatus according to claim 1, further comprising a support that supports the bolt, wherein the bolt and the nut as a whole are configured to swing with respect to the support.

* * * * *